US012615669B2

(12) United States Patent
Echigo et al.

(10) Patent No.: US 12,615,669 B2
(45) Date of Patent: Apr. 28, 2026

(54) TERMINAL AND RADIO COMMUNICATION METHOD

(71) Applicant: NTT DOCOMO, INC., Tokyo (JP)

(72) Inventors: Haruhi Echigo, Tokyo (JP); Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/558,866

(22) PCT Filed: May 10, 2021

(86) PCT No.: PCT/JP2021/017764
§ 371 (c)(1),
(2) Date: Nov. 3, 2023

(87) PCT Pub. No.: WO2022/239082
PCT Pub. Date: Nov. 17, 2022

(65) Prior Publication Data
US 2024/0244667 A1     Jul. 18, 2024

(51) Int. Cl.
*H04W 74/0833*     (2024.01)
*H04L 5/00*     (2006.01)
*H04W 74/08*     (2024.01)
*H04W 76/20*     (2018.01)

(52) U.S. Cl.
CPC ....... *H04W 74/0833* (2013.01); *H04L 5/0051* (2013.01); *H04W 74/0866* (2013.01); *H04W 76/20* (2018.02)

(58) Field of Classification Search
CPC ........... H04W 74/0833; H04W 74/006; H04W 74/004; H04W 74/0838; H04W 72/23;

H04W 74/0836; H04W 72/0453; H04W 72/1268; H04W 74/002; H04W 72/21; H04W 72/232; H04W 72/04; H04W 24/10; H04W 48/12; H04W 74/0866; H04W 76/20; H04W 74/08; H04L 5/0044; H04L 5/0057; H04L 5/0094; H04L 5/0051; H04B 17/328; H04B 17/327; H04J 13/0062
See application file for complete search history.

(56) References Cited

U.S. PATENT DOCUMENTS 12,273,913 B2 *   4/2025   Xiong ............... H04W 74/0866
2021/0051707 A1 *   2/2021   Rastegardoost .......... H04L 5/10
2023/0085104 A1 *   3/2023   Park .......................... H04L 1/18
                                                            370/329

FOREIGN PATENT DOCUMENTS

CA         3096830 A1 *   9/2020   ............. H04W 72/23
EP         3777409 B1 *   2/2023   .......... H04W 4/0836
WO   2016163508 A1   10/2016

OTHER PUBLICATIONS

China Telecom; "New WID on NR coverage enhancements"; 3GPP TSG RAN Meeting #90e, RP-202928; Electronic Meeting; Dec. 7-11, 2020 (5 pages).

(Continued)

*Primary Examiner* — Olumide Ajibade Akonai
(74) *Attorney, Agent, or Firm* — Osha Bergman Watanabe & Burton LLP

(57) ABSTRACT

A terminal repeatedly transmits a message in a random access channel procedure, and configures a random access resource according to whether the repeated transmission is present, based on configuration of a radio resource control layer.

4 Claims, 16 Drawing Sheets

(56)                    References Cited

OTHER PUBLICATIONS

International Search Report issued in corresponding International Application No. PCT/JP2021/017764, mailed on Dec. 7, 2021 (9 pages).
Written Opinion issued in corresponding International Application No. PCT/JP2021/017764, mailed on Dec. 7, 2021 (6 pages).
CATT; "Discussion on Type A PUSCH repetitions for Msg3"; 3GPP TSG RAN WG1 #104b-e, R1-2102646; e-Meeting; Apr. 12-20, 2021 (12 pages).
WILUS Inc .; "Discussion on Type A PUSCH repetitions for Msg3"; 3GPP TSG RAN WG1 #104b-e, R1-2103702; e-Meeting; Apr. 12-20, 2021 (6 pages).
H. Huawei; "Discussion on Msg3 repetition for coverage enhancement"; 3GPP TSG RAN WG1 Meeting #104bis-e, R1-2102315; E-Meeting; Apr. 12-20, 2021 (6 pages).
H. Huawei; "Discussion on the potential coverage enhancement solutions for other channels"; 3GPP TSG RAN WG1 Meeting #103-e, R1-2007585; E-Meeting; Oct. 26-Nov. 13, 2020 (4 pages).
OPPO; "Type A PUSCH repetitions for Msg3 coverage"; 3GPP TSG RAN WG1 #104b-e, R1-2102410; E-Meeting; Apr. 12-20, 2021 (6 pages).
Office Action issued in Japanese Patent Application No. 2023-520601, dated Jun. 10, 2025 (8 pages).

* cited by examiner

Msg3 Repetition IS NOT REQUESTED/SUPPORTED

Msg3 Repetition IS REQUESTED/SUPPORTED

Msg3 Repetition IS NOT REQUESTED/SUPPORTED

Msg3 Repetition IS REQUESTED/SUPPORTED

0                  Preamble index            64

☐ Msg3 Repetition IS NOT REQUESTED/SUPPORTED      ▨ Msg3 Repetition IS REQUESTED/SUPPORTED 0                  Preamble index            64

☐ Msg3 Repetition IS NOT REQUESTED/SUPPORTED      ▨ Msg3 Repetition IS REQUESTED/SUPPORTED

FIG. 10

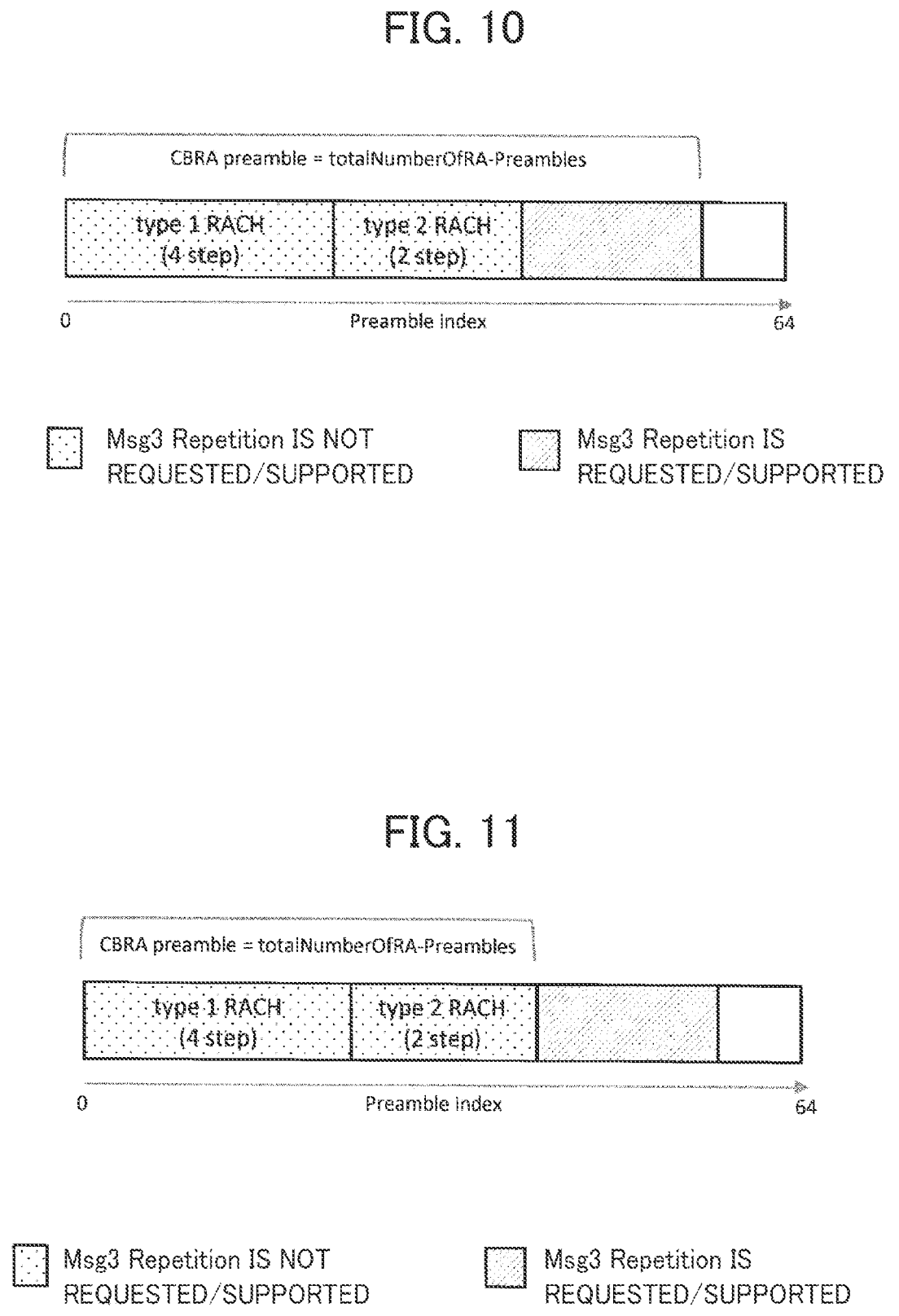

CBRA preamble = totalNumberOfRA-Preambles

| type 1 RACH (4 step) | type 2 RACH (2 step) | | |

0              Preamble Index             64

☐ Msg3 Repetition IS NOT REQUESTED/SUPPORTED      ☐ Msg3 Repetition IS REQUESTED/SUPPORTED

FIG. 11

CBRA preamble = totalNumberOfRA-Preambles

| type 1 RACH (4 step) | type 2 RACH (2 step) | | |

0              Preamble Index             64

☐ Msg3 Repetition IS NOT REQUESTED/SUPPORTED      ☐ Msg3 Repetition IS REQUESTED/SUPPORTED 0                    Preamble index                    64

Msg3 Repetition IS
REQUESTED/SUPPORTED

FIG. 13
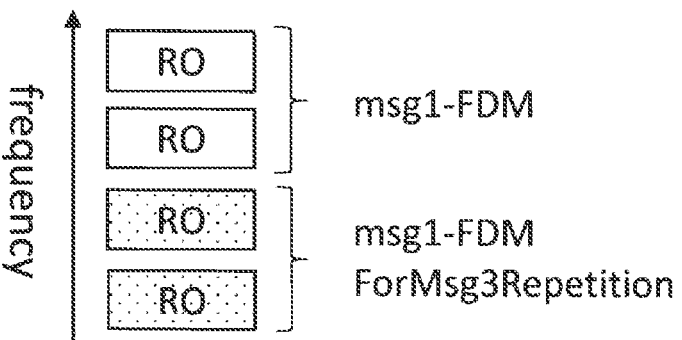
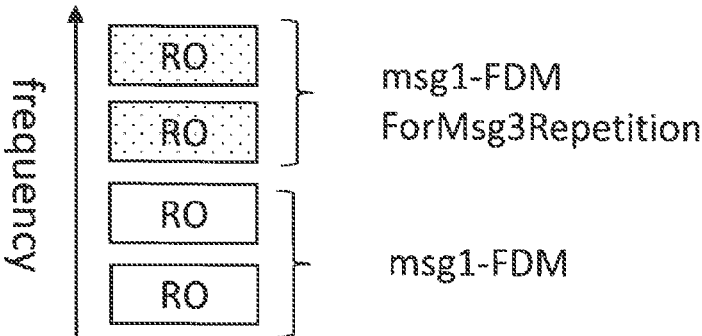
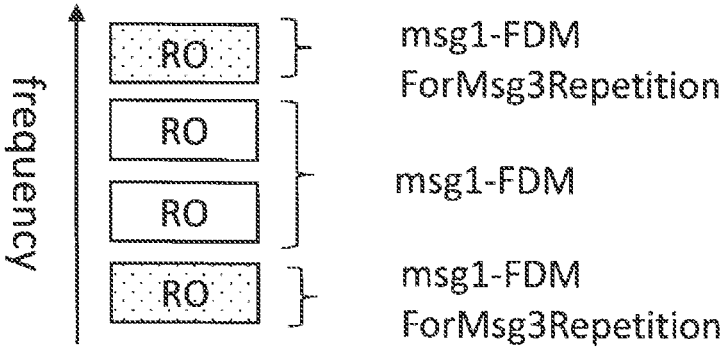

FIG. 14
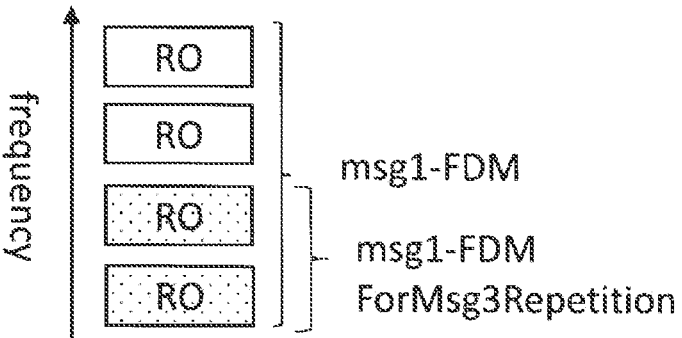
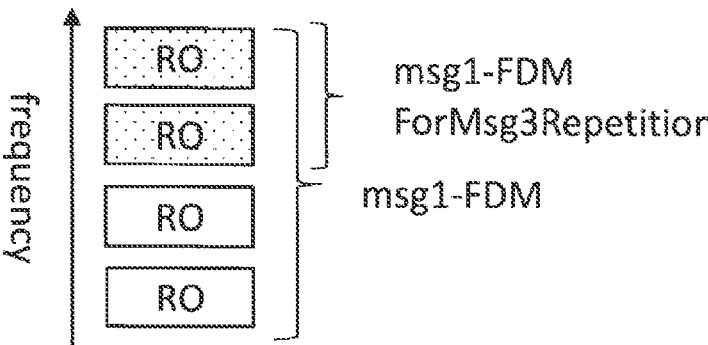
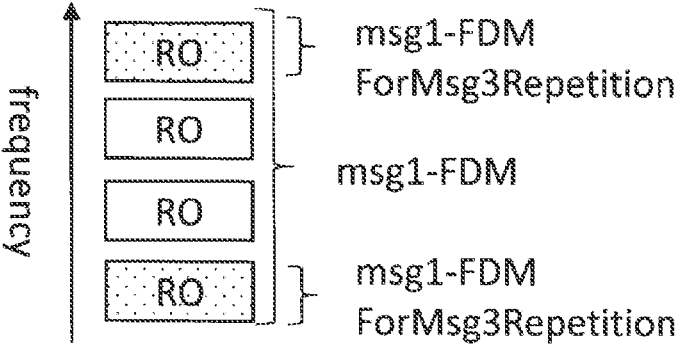

FIG. 15

| PRACH Configuration for Msg3 repetition Index | Preamble format | $n_{SFN} \bmod x = y$ | | Subframe number | Starting symbol | # of slots within a subframe | # of occasions within aslot | PRACH duration |
|---|---|---|---|---|---|---|---|---|
| | | $x$ | $y$ | | | | | |
| 0 | 0 | 16 | 1 | 9 | 0 | - | - | 0 |
| 1 | 0 | 8 | 1 | 9 | 0 | - | - | 0 |
| 2 | 0 | 4 | 1 | 9 | 0 | - | - | 0 |
| 3 | 0 | 2 | 0 | 9 | 0 | - | - | 0 |
| 4 | 0 | 2 | 1 | 9 | 0 | - | - | 0 |
| 5 | 0 | 2 | 0 | 4 | 0 | - | - | 0 |
| 6 | 0 | 2 | 1 | 4 | 0 | - | - | 0 |
| 7 | 0 | 1 | 0 | 9 | 0 | - | - | 0 |

| PRACH Configuration Index | Preamble format | $n_{SFN} \bmod x = y$ | | Subframe number | Starting symbol | # of slots within a subframe | # of occasions within a slot | PRACH duration | Starting symbol for Msg3 repetition | x | y | subframe number for Msg3 repetition |
|---|---|---|---|---|---|---|---|---|---|---|---|---|
| | | x | y | | | | | | | | | |
| 0 | 0 | 16 | 1 | 9 | 0 | - | - | 0 | 4 | 16 | 9 | 9 |
| 1 | 0 | 8 | 1 | 9 | 0 | - | - | 0 | 4 | 8 | 5 | 9 |
| 2 | 0 | 4 | 1 | 9 | 0 | - | - | 0 | 4 | 4 | 2 | 9 |
| 3 | 0 | 2 | 0 | 9 | 0 | - | - | 0 | 0 | 2 | 0 | 4 |
| 4 | 0 | 2 | 1 | 9 | 0 | - | - | 0 | - | - | - | - |
| 5 | 0 | 2 | 0 | 4 | 0 | - | - | 0 | - | - | - | - |
| 6 | 0 | 2 | 1 | 4 | 0 | - | - | 0 | - | - | - | - |
| 7 | 0 | 1 | 0 | 9 | 0 | - | - | 0 | - | - | - | - |

FIG. 18

Opt1

| $rv_{id}$ to be applied to $n^{th}$ transmission occasion | | | |
|---|---|---|---|
| $n \bmod 4 = 0$ | $n \bmod 4 = 1$ | $n \bmod 4 = 2$ | $n \bmod 4 = 3$ |
| 0 | 2 | 3 | 1 |

Opt2

| $rv_{id}$ to be applied to $n^{th}$ transmission occasion | | | |
|---|---|---|---|
| $n \bmod 4 = 0$ | $n \bmod 4 = 1$ | $n \bmod 4 = 2$ | $n \bmod 4 = 3$ |
| 0 | 0 | 0 | 0 |

Opt3

| $rv_{id}$ to be applied to $n^{th}$ transmission occasion | | | | | | | |
|---|---|---|---|---|---|---|---|
| $n \bmod 8 = 0$ | $n \bmod 8 = 1$ | $n \bmod 8 = 2$ | $n \bmod 8 = 3$ | $n \bmod 8 = 4$ | $n \bmod 8 = 5$ | $n \bmod 8 = 6$ | $n \bmod 8 = 7$ |
| 0 | 0 | 2 | 2 | 3 | 3 | 1 | 1 |

Opt4

| $rv_{id}$ to be applied to $n^{th}$ transmission occasion | | | |
|---|---|---|---|
| $n \bmod 4 = 0$ | $n \bmod 4 = 1$ | $n \bmod 4 = 2$ | $n \bmod 4 = 3$ |
| 0 | 2 | 0 | 2 |

Opt5

| $rv_{id}$ to be applied to $n^{th}$ transmission occasion | | | |
|---|---|---|---|
| $n \bmod 4 = 0$ | $n \bmod 4 = 1$ | $n \bmod 4 = 2$ | $n \bmod 4 = 3$ |
| 0 | 0 | 2 | 2 |

FIG. 19

Opt1

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Opt2

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 0 | 0 | 0 |
| 2 | 2 | 2 | 2 | 2 |
| 3 | 3 | 3 | 3 | 3 |
| 1 | 1 | 1 | 1 | 1 |

Opt3

| $rv_{id}$ indicated by the DCI scheduling the PDSCH | $0rv_{id}$ to be applied to $n^{th}$ transmission occasion | | | | | | | |
|---|---|---|---|---|---|---|---|---|
| | n mod 8 = 0 | n mod 8 = 1 | n mod 8 = 2 | n mod 8 = 3 | n mod 8 = 4 | n mod 8 = 5 | n mod 8 = 6 | n mod 8 = 7 |
| 0 | 0 | 0 | 2 | 2 | 3 | 3 | 1 | 1 |
| 2 | 2 | 2 | 3 | 3 | 1 | 1 | 0 | 0 |
| 3 | 3 | 3 | 1 | 1 | 0 | 0 | 2 | 2 |
| 1 | 1 | 1 | 3 | 3 | 1 | 1 | 0 | 0 |

TERMINAL AND RADIO COMMUNICATION METHOD

TECHNICAL FIELD

The present disclosure relates to a terminal and a radio communication method for supporting repetition of a message in a random access channel procedure.

BACKGROUND ART

The 3rd Generation Partnership Project (3GPP) has prepared a specification for the 5th generation mobile communication system (also referred to as 5G, New Radio (NR), or Next Generation (NG)), and further a specification for a next-generation system referred to as Beyond 5G, 5G Evolution, or 6G is also being prepared.

For example, in 3GPP Release-17, a Work Item relating to Coverage Enhancement (CE) in NR has been agreed (Non-Patent Literature 1).

Specifically, a specification for Repetition of an uplink data channel (Physical Uplink Shared Channel: PUSCH), which is used to transmit a message (Msg3) in a Random Access Channel (RACH) procedure, is being studied.

CITATION LIST

Non-Patent Literature

Non-Patent Literature 1: "New WID on NR coverage enhancements", RP-202928, 3GPP TSG RAN meeting #90e, 3GPP, December 2020

SUMMARY OF THE INVENTION

If Repetition of a message (Msg3) in a RACH procedure is supported, it is thought that there is room for improvement for a specific operation of a terminal (User Equipment, UE) related to Repetition.

Therefore, the following disclosure has been made in view of such a situation, and an object of the present disclosure is to provide a terminal and a radio communication method that can perform a more appropriate operation for Repetition of a message (Msg3) in a RACH procedure.

One aspect of the present disclosure is a terminal (UE 200) including: a transmission unit (radio signal transmission and reception unit 210) that repeatedly transmits a message in a random access channel procedure; and a control unit (control unit 270) that configures a random access resource according to whether the repeated transmission is present, based on configuration of a radio resource control layer.

One aspect of the present disclosure is a terminal (UE 200) including: a transmission unit (radio signal transmission and reception unit 210) that repeatedly transmits a message in a random access channel procedure; and a control unit (control unit 270) that reports, to a network, whether channel estimation of uplink channels allocated to a plurality of slots can be applied to the message using demodulation reference signals allocated to the plurality of slots.

One aspect of the present disclosure is a terminal (UE 200) including: a transmission unit (radio signal transmission and reception unit 210) that repeatedly transmits a message in a random access channel procedure; and a control unit (control unit 270) that requests the repeated transmission, based on whether a specific condition regarding a random access is satisfied.

One aspect of the present disclosure is a terminal (UE 200) including: a transmission unit (radio signal transmission and reception unit 210) that repeatedly transmits a message in a random access channel procedure; and a control unit (control unit 270) that configures a redundancy version of an automatic re-transmission request that is applied to transmission of the message, based on configuration of a radio resource control layer or a specific criterion.

One aspect of the present disclosure is a radio communication method including: a step of repeatedly transmitting a message in a random access channel procedure; and a step of configuring a random access resource according to whether the repeated transmission is present, based on configuration of a radio resource control layer.

One aspect of the present disclosure is a radio communication method including: a step of repeatedly transmitting a message in a random access channel procedure; and a step of reporting, to a network, whether channel estimation of uplink channels allocated to a plurality of slots can be applied to the message using demodulation reference signals allocated to the plurality of slots.

BRIEF DESCRIPTION OF DRAWINGS

FIG. 10 is a diagram showing a configuration example (part 3) of a PRACH preamble in Operation Example 1.

FIG. 11 is a diagram showing a configuration example (part 4) of a PRACH preamble in Operation Example 1.

FIG. 13 is a diagram showing a configuration example (part 1) of a PRACH resource in a frequency direction in Operation Example 1.

FIG. 14 is a diagram showing a configuration example (part 2) of a PRACH resource in a frequency direction in Operation Example 1.

FIG. 15 is a diagram showing a configuration example (part 1) of a PRACH Configuration for Msg3 Repetition in Operation Example 1.

FIG. 16 is a diagram showing a configuration example (part 2) of a PRACH Configuration for Msg3 Repetition in Operation Example 1.

FIG. 18 is a diagram showing an application example (part 1) of an RV id in a transmission occasion in Operation Example 4.

FIG. 19 is a diagram showing an application example (part 2) of an RV id in a transmission occasion in Operation Example 4.

DESCRIPTION OF EMBODIMENTS

Figure 1:
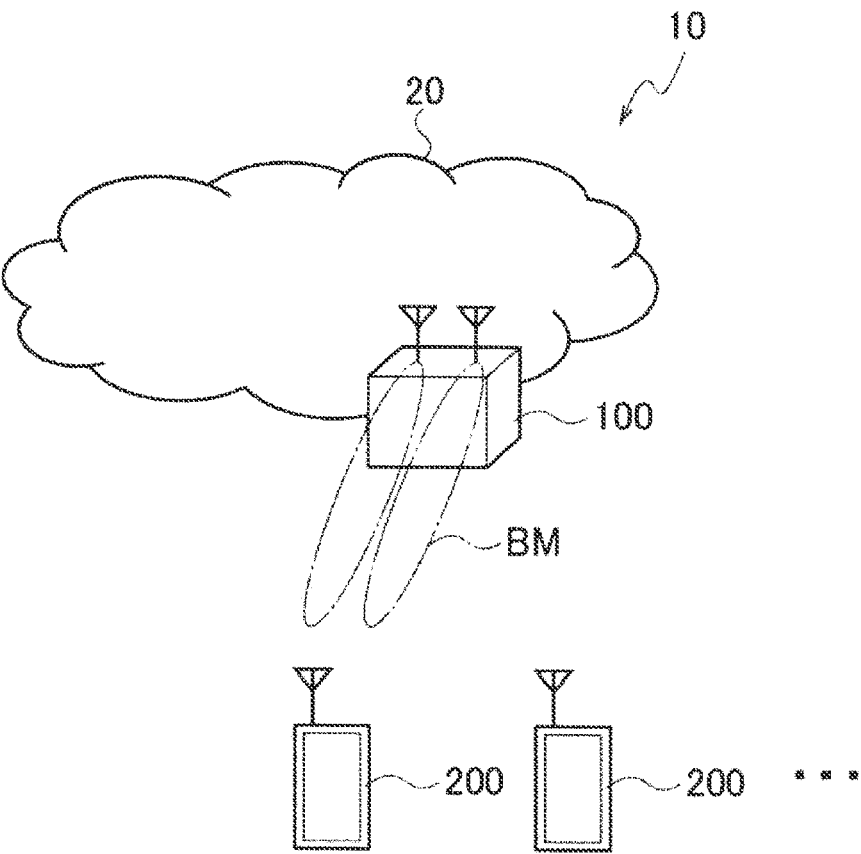
FIG. 1 is an overall schematic configuration diagram of a radio communication system 10.

Embodiments will be explained below with reference to the drawings. Note that the same or similar reference numerals have been attached to the same functions and configurations, and the description thereof is omitted as appropriate.

(1) Overall Schematic Configuration of Radio Communication System

FIG. 1 is an overall schematic configuration diagram of a radio communication system 10 according to the present embodiment. The radio communication system 10 is compliant with 5G New Radio(NR) and includes a Next Generation-Radio Access Network 20 (hereinafter referred to as an NG-RAN 20), and a terminal 200 (User Equipment 200, hereinafter referred to as a UE 200).

The radio communication system 10 may be compliant with a method referred to as Beyond 5G, 5G Evolution, or 6G.

The NG-RAN 20 includes a radio base station 100 (hereinafter referred to as a gNB 100). The specific configuration of the radio communication system 10 including the number of gNBs and UEs is not limited to the example shown in FIG. 1.

In practice the NG-RAN 20 includes a plurality of NG-RAN Nodes, specifically gNBs (or ng-eNBs), and is connected to a 5G-compliant core network (hereinafter referred to as 5GC, not shown). The NG-RAN 20 and 5GC may simply be expressed as a "network".

The gNB 100 is a radio base station compliant with NR and performs NR-compliant radio communication with the UE 200. The gNB 100 and the UE 200 can support Massive MIMO generating a beam BM with higher directivity by controlling radio signals transmitted from a plurality of antenna elements, Carrier Aggregation (CA) bundling and using a plurality of Component Carriers (CCs), Dual Connectivity (DC) simultaneously communicating between the UE and each of the plurality of NG-RAN Nodes, and the like.

The radio communication system 10 supports an FR 1 and an FR 2. Frequency bands of each Frequency Range (FR) are as follows.

FR 1: 410 MHz to 7.125 GHz

FR 2: 24.25 GHz to 52.6 GHz

In the FR 1, Sub-Carrier Spacing (SCS) of 15, 30, or 60 kHz is used and a bandwidth (BW) of 5 to 100 MHz may be used. The FR 2 is higher than the FR 1, an SCS of 60 or 120 kHz (240 kHz may be included) is used and a bandwidth (BW) of 50 to 400 MHz may be used.

In addition, the radio communication system 10 may support a higher frequency band than the frequency band of the FR 2. Specifically, the radio communication system 10 can support a frequency band greater than 52.6 GHz and up to 114.25 GHz.

Further, Cyclic Prefix-Orthogonal Frequency Division Multiplexing (CP-OFDM)/Discrete Fourier Transform-Spread (DFT-S-OFDM) with larger Sub-Carrier Spacing (SCS) may be applied. Furthermore, DFT-S-OFDM may be applied not only to an uplink (UL) but also to a downlink (DL).

Figure 2:
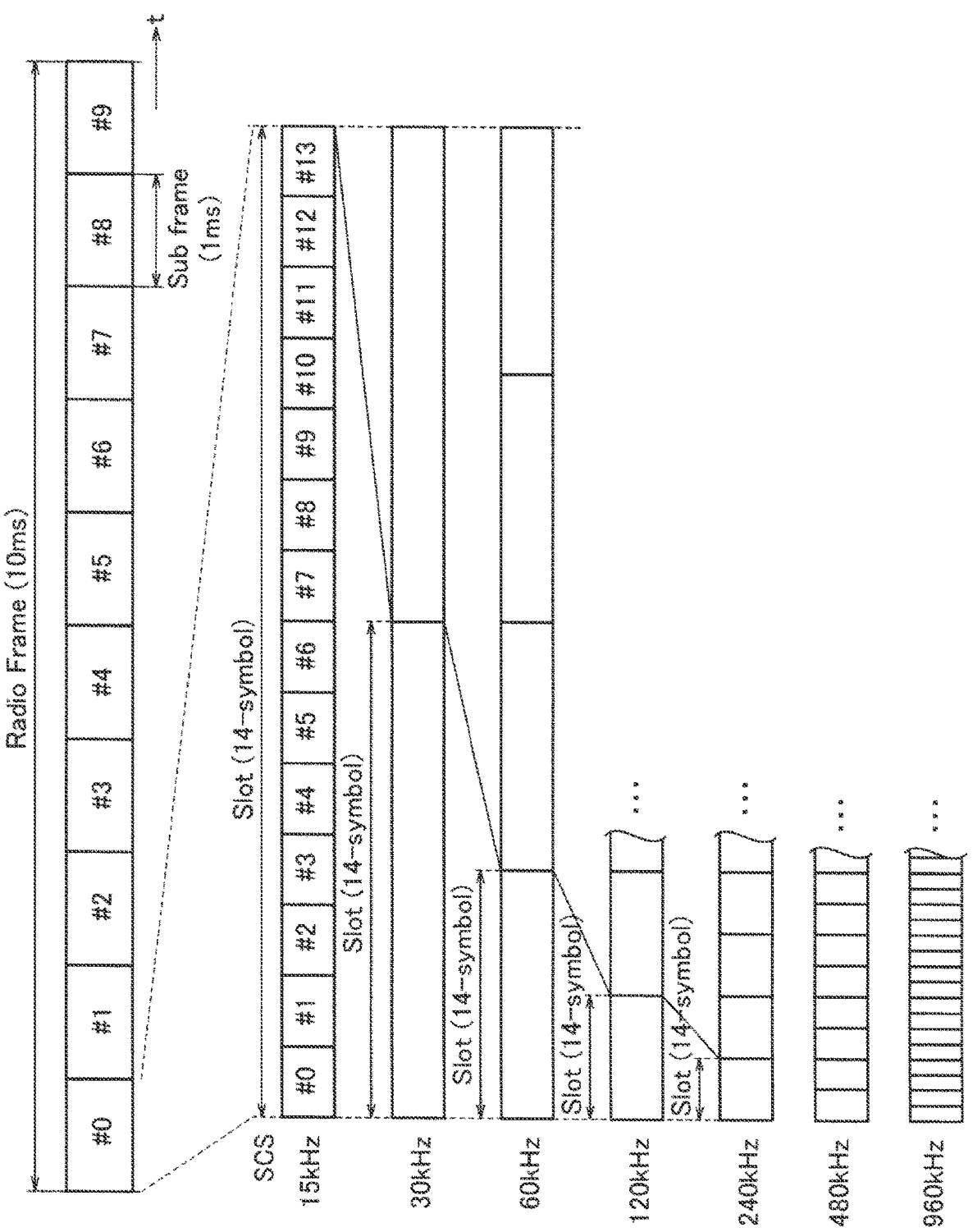
FIG. 2 is a diagram showing configuration examples of radio frames, subframes, and slots used in the radio communication system 10.

FIG. 2 shows a configuration example of radio frames, subframes, and slots used in the radio communication system 10.

As shown in FIG. 2, 14 symbols constitute one slot, and the larger (wider) the SCS, the shorter the symbol period (and the slot period). The number of symbols constituting one slot does not necessarily have to be 14 (for example, 28, 56 symbols). In addition, the number of slots per subframe may vary depending on the SCS. In addition, the SCS may be wider than 240 kHz (for example, 480 kHz or 960 kHz as shown in FIG. 2).

Note that the time direction (t) shown in FIG. 2 may be referred to as the time domain, symbol period, or symbol time. Further, the frequency direction may be referred to as the frequency domain, resource block, subcarrier, Bandwidth part (BWP), or the like.

The radio communication system 10 can support Coverage Enhancement (CE) for expanding the coverage of cells (or may be physical channels) formed by the gNB 100. In the CE, a mechanism for increasing reception success rates of various physical channels may be provided.

For example, the gNB 100 can support repeated transmission of a Physical Downlink Shared Channel (PDSCH), and the UE 200 can support repeated transmission of a Physical Uplink Shared Channel (PUSCH).

In addition, a plurality of types of UEs 200 may be used in the radio communication system 10. For example, as the UEs 200, there may be a plurality of types of terminals with different functions or performance or with different 3GPP Releases that are supported. The terminals (UEs) may be referred to as a first type of terminal and a second type of terminal. Further, the term type may be replaced by other terms such as generation, release, or the like. The first type of terminal and the second type of terminal may be referred to as an enhanced UE and a legacy UE, respectively. The enhanced UE supports the latest release of 3GPP, and the legacy UE may be interpreted as a UE that does not support the latest release.

In the radio communication system 10, the Slot Configuration pattern of time division duplex communication (TDD) may be configured. For example, a DDDSU (D: downlink (DL) symbol, S: DL/uplink (UL) or guard symbol, U: UL symbol) may be specified (see 3GPP TS38.101-4).

The "D" indicates a slot including all DL symbols, and the "S" indicates a slot in which DL symbols, UL symbols, and guard symbols (G) are mixed. The "U" indicates a slot including all UL symbols.

(2) Functional Block Configuration of Radio Communication System

Figure 3:
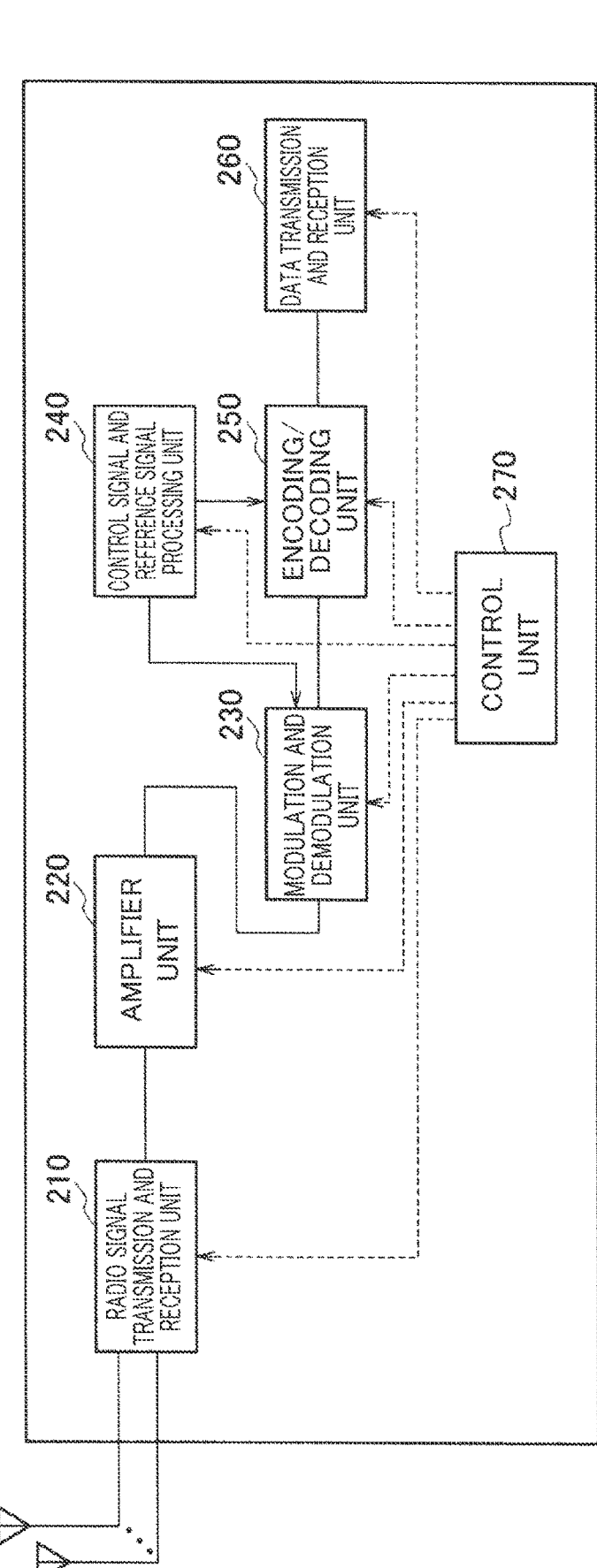
FIG. 3 is a functional block diagram of a gNB 100 and a UE 200.

Next, the functional block configuration of the radio communication system 10 will be described. Specifically, the functional block configuration of the UE 200 will be described. FIG. 3 is a functional block diagram of the gNB 100 and the UE 200.

As shown in FIG. 3, the UE 200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

Note that FIG. 3 shows only the main functional blocks relevant to the description of the embodiment, and the UE 200 (gNB 100) has other functional blocks (for example, a power supply unit). Further, FIG. 3 shows the functional block configuration of the UE 200, and please refer to FIG. 20 for the hardware configuration.

The radio signal transmission and reception unit 210 transmits and receives NR-compliant radio signals. The radio signal transmission and reception unit 210 can support Massive MIMO in which a beam with higher directivity is generated by controlling radio (RF) signals transmitted from a plurality of antenna elements, Carrier Aggregation (CA) in which a plurality of Component Carriers (CCs) are bundled and used, Dual Connectivity (DC) in which communication is performed simultaneously between the UE and each of the two NG-RAN Nodes, and the like.

Further, the radio signal transmission and reception unit 210 may transmit a Physical Uplink Shared Channel. Specifically, the radio signal transmission and reception unit 210 may transmit a PUSCH toward a network (gNB 100). The radio signal transmission and reception unit 210 may support repeated transmission (repetition) of a PUSCH.

A plurality of types of repeated transmission of a PUSCH may be specified. Specifically, Repetition type A and Repetition type B may be specified. Repetition type A may be interpreted as a form in which a PUSCH allocated in a slot is repeatedly transmitted. That is, the PUSCH is 14 symbols or less, and shall not be allocated across a plurality of slots (adjacent slots).

Meanwhile, Repetition type B may be interpreted as repeated transmission of a PUSCH in which a PUSCH of 15 symbols or more may be allocated. In the present embodiment, it may be permitted to allocate such a PUSCH across a plurality of slots.

In addition, the radio signal transmission and reception unit 210 may transmit a random access preamble as a first message (hereinafter referred to as Msg1) in a random access channel procedure (hereinafter referred to as a RACH (Random Access Channel) procedure).

The radio signal transmission and reception unit 210 may receive a second message (hereinafter referred to as Msg2) as a response message to the Msg1 in the RACH procedure (Random Access Response (RAR)).

After receiving the Msg2, the radio signal transmission and reception unit 210 may transmit a third message (hereinafter referred to as Msg3) via a PUSCH in the RACH procedure.

The radio signal transmission and reception unit 210 may receive a fourth message (hereinafter referred to as Msg4) as a response message to the Msg3 in the RACH procedure (3GPP TS38.321 V16.2.1 § 5.1 "Random Access procedure").

For example, the Msg1 may be transmitted via a Physical Random Access Channel (PRACH). The Msg1 may be referred to as a PRACH preamble. The Msg2 may be transmitted via a PDSCH. The Msg2 may be referred to as a Random Access Response (RAR). The Msg3 may be referred to as an RRC Connection Request. The Msg4 may be referred to as an RRC Connection Setup.

Further, the Msg3 may be referred to as a PUSCH scheduled by a RAR UL grant or a PUSCH scheduled by DCI scrambled by Temporary Cell-Radio Network Temporary Identifier (TC-RNTI).

The radio signal transmission and reception unit 210 repeatedly transmits the Msg3. In the present embodiment, the radio signal transmission and reception unit 210 may constitute a transmitting unit that repeatedly transmits messages in a random access channel procedure. Details of the repeated transmission of the Msg3 will be described later.

The amplifier unit 220 is constituted by a Power Amplifier (PA)/a Low Noise Amplifier (LNA), or the like. The amplifier unit 220 amplifies a signal output from the modulation and demodulation unit 230 to have a predetermined power level. Further, the amplifier unit 220 amplifies an RF signal output from the radio signal transmission and reception unit 210.

The modulation and demodulation unit 230 performs data modulation/demodulation, transmission power configuration, resource block allocation, and the like for each predetermined communication destination (the gNB 100 or the like). In the modulation and demodulation unit 230, Cyclic Prefix-Orthogonal Frequency Division Multiplexing (CP-OFDM)/Discrete Fourier Transform-Spread (DFT-S-OFDM) may be applied. Further, DFT-S-OFDM may be used not only for the uplink (UL) but also for the downlink (DL).

The control signal and reference signal processing unit 240 performs processing for various control signals transmitted and received by the UE 200 and processing for various reference signals transmitted and received by the UE 200.

Specifically, the control signal and reference signal processing unit 240 receives various control signals transmitted from the gNB 100 via a predetermined control channel, for example, control signals of a radio resource control layer (RRC). Further, the control signal and reference signal processing unit 240 transmits various control signals to the gNB 100 via the predetermined control channel.

The control signal and reference signal processing unit 240 performs processing using Reference Signals (RSs) such as a Demodulation Reference Signal (DMRS), a Phase Tracking Reference Signal (PTRS), and the like.

A Demodulation Reference Signal (DMRS) is a terminal-specific reference signal (a pilot signal) known between a base station and a terminal for estimating a fading channel used for data demodulation. The PTRS is a terminal-specific reference signal for the purpose of estimating phase noise, which becomes a problem in a high frequency band.

In addition to a DMRS and a PTRS, the reference signals may include a Channel State Information-Reference Signal (CSI-RS), a Sounding Reference Signal (SRS), and a Positioning Reference Signal (PRS) for position information.

Further, the channel includes a control channel and a data channel. The control channel includes a Physical Downlink Control Channel (PDCCH), a Physical Uplink Control Channel (PUCCH), a Random Access Channel (RACH), Downlink Control Information (DCI) including a Random Access Radio Network Temporary Identifier (RA-RNTI), and a Physical Broadcast Channel (PBCH).

Further, the data channel includes a Physical Downlink Shared Channel (PDSCH), a Physical Uplink Shared Channel (PUSCH), and the like. The data may mean data transmitted via a data channel.

Further, the control signal and reference signal processing unit 240 may transmit, to the network, capability information of the UE 200 on the allocation of a Physical Uplink Shared Channel (PUSCH).

Specifically, the control signal and reference signal processing unit 240 can transmit, to the gNB 100, UE Capability Information on the allocation of a PUSCH (may include repetition). Details of the UE Capability Information will be described later.

Further, the control signal and reference signal processing unit 240 may transmit DMRSs such that Joint channel estimation (described later) can be performed between specific PUSCHs, between PUCCHs, or between a PUSCH and a PUCCH. This time period may be referred to as a Time domain window.

The encoding/decoding unit 250 performs data division/ connection, channel coding/decoding, and the like for each predetermined communication destination (the gNB 100 or another gNB).

Specifically, the encoding/decoding unit 250 divides the data output from the data transmission and reception unit 260 into predetermined sizes, and performs channel coding on the divided data. Further, the encoding/decoding unit 250 decodes the data output from the modulation and demodulation unit 230 and connects the decoded data.

The data transmission and reception unit 260 transmits and receives a Protocol Data Unit (PDU) and a Service Data Unit (SDU). Specifically, the data transmission and reception unit 260 performs assembly/disassembly and the like of PDUs/SDUs in a plurality of layers (a medium access control layer (MAC), a radio link control layer (RLC), and a packet data convergence protocol layer (PDCP), and the like). Further, the data transmission and reception unit 260 performs data error correction and re-transmission control based on a Hybrid automatic repeat request (ARQ).

The control unit 270 controls individual functional blocks that configure the UE 200. In particular, in the present embodiment, the control unit 270 performs control on the Repetition of the PUSCH for the Msg3 (hereinafter abbreviated as Msg3 PUSCH as appropriate).

Specifically, the control unit 270 can configure a random access resource according to whether there is repeated transmission of the Msg3, based on the configuration of the radio resource control layer (RRC). For example, the control unit 270 may use different PRACH resources/sequences according to a request for repeated transmission of the Msg3 PUSCH (may be read as Msg3 Repetition) or whether there is support therefor.

A request for repeated transmission of the Msg3 PUSCH may mean that the UE 200 requests or the network instructs the execution of repetition of the Msg3 (PUSCH).

Whether there is support for repeated transmission of the Msg3 PUSCH may mean whether the UE 200 can perform the repeated transmission, that is, whether the UE 200 has the capability for performing the repeated transmission.

For example, the control unit 270 may configure the PRACH preamble when requesting/supporting Msg3 Repetition, based on the RRC configuration.

Further, the control unit 270 may add a PRACH Occasion (RO) when requesting/supporting Msg3 Repetition, based on the RRC configuration.

In this way, the control unit 270 may judge (determine) PRACH resources/sequences corresponding to whether there is a request/support for Msg3 Repetition, based on the RRC configuration.

A specific example of operation of the UE 200 when requesting/supporting Msg3 Repetition will be described later.

Further, the control unit 270 may report to the network (gNB 100) whether Joint channel estimation can be applied to the Msg3. Joint channel estimation may be interpreted as a technique for performing channel estimation based on DMRSs that are present (allocated) in a plurality of slots.

That is, the control unit 270 may report to the network whether channel estimation of uplink channels allocated to a plurality of slots can be applied to a specific message such as the Msg3 using DMRSs (demodulation reference signals) allocated to the plurality of slots.

Further, the control unit 270 may request repeated transmission of the Msg3 based on whether a specific condition for random access is satisfied. Specifically, the control unit 270 may determine a condition for when Msg3 Repetition is requested, based on a specific condition (may be a rule) or a parameter configured by the RRC.

For example, the specific condition may be configured based on parameters such as the reception quality (for example, the Reference Signal Received Power (RSRP)) of a synchronization signal block (SSB (Synchronization Signal (SS)/Physical Broadcast CHannel (PBCH) Block)), the number of transmission attempts for the Msg1, the total power value obtained with power ramping, and the like. The examples are not limited to the parameters, and may be parameters such as the quality, the power value, and the number of transmissions related to the random access procedure.

Further, the control unit 270 may configure a redundancy version of an automatic re-transmission request applied to the transmission of a message regarding the random access procedure for the Msg3 or the like, based on the configuration of the radio resource control layer (RRC) or a specific criterion.

Specifically, the control unit 270 may apply Redundancy Version (RV) identification information (id) of a Hybrid Automatic repeat request (HARQ) at each transmission occasion and transmit a message, based on a predetermined rule applied to Msg3 repetition or the parameters configured by the RRC. For the RV id, for example, RV 0, RV 1, RV 2, and RV 3 may be configured. The RV may be associated with different starting positions of the circular buffer.

Further, in this case, the control unit 270 may apply (configure) an RV that is the same as or different from a PUSCH scheduled by a RAR UL grant or a PUSCH scheduled by DCI scrambled by TC-RNTI.

(3) Operation of Radio Communication System

Next, the operation of the radio communication system 10 will be described. Specifically, the operation related to Repetition of a message (Msg3) of the RACH procedure will be described.

(3.1) Assumptions

Figure 4:
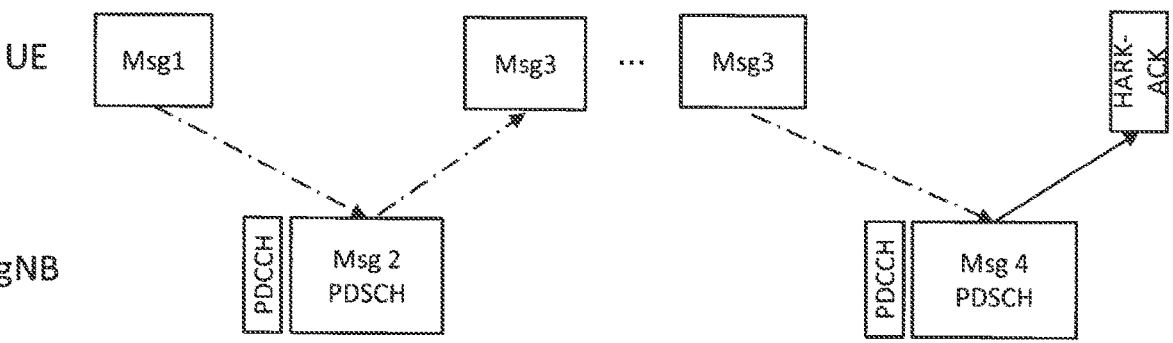
FIG. 4 is a diagram showing an example of a random access sequence including Msg3 Repetition.

FIG. 4 shows an example of a random access sequence including Msg3 Repetition. As shown in FIG. 4, the UE 200 first transmits the Msg1 to the NG-RAN 20 (gNB 100) according to the RACH procedure. The Msg1 may be referred to as a random access preamble, as described above.

The UE 200 receives the Msg2 corresponding to the Msg1 from the NG-RAN 20. The UE 200 transmits the Msg3 corresponding to the Msg2 to the NG-RAN 20. As shown in FIG. 4, the Msg3 may be transmitted repeatedly. Although not shown in FIG. 4, the Msg1 or the like may be transmitted repeatedly.

The UE 200 may receive the Msg4 for any one of the Msg3 from the NG-RAN 20. The UE 200 may transmit an acknowledgment (Hybrid Automatic repeat request (HARQ)-ACK) for the Msg4 to the NG-RAN 20.

Figure 5:
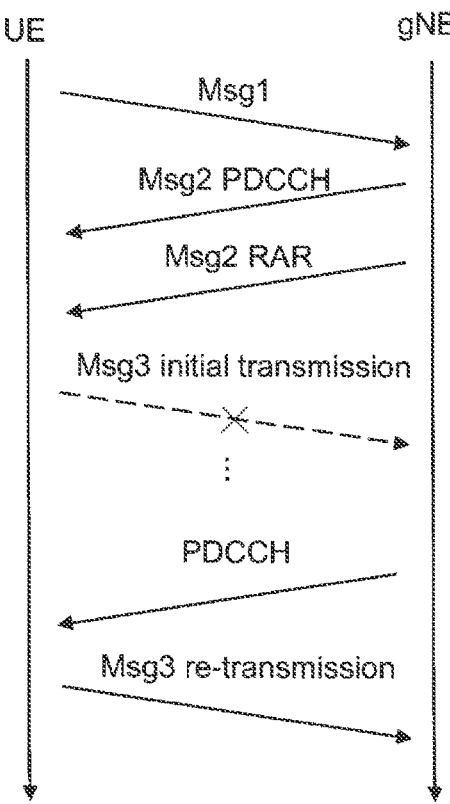
FIG. 5 is a diagram showing an example of a random access sequence including initial transmission and re-transmission of the Msg3.

FIG. 5 shows an example of a random access sequence that includes the initial transmission and re-transmission of the Msg3.

As shown in FIG. 5, the 3GPP specification specifies re-transmission of the Msg3. Re-transmission of the Msg3 may be performed if the initial transmission of the Msg3 fails (the message can not be received by the network).

For the Msg3 re-transmission, resources may be allocated by DCI format 0_0 with CRC scrambled by TC-RNTI.

The PUSCH Repetition used for the Msg3 transmission (may include re-transmission) may be related to the PUSCH Repetition of Type A.

There are Type A and Type B for an existing PUSCH mapping type. Type A may be used only for repetition Type A, and Type B may be used for both repetition Type A and repetition Type B. The existing Type A and Type B assume per-slot allocation, and therefore the value of L may not exceed "14" (number of symbols) (see § 6.1.2 of 3GPP TS38.214 V16.2.0).

(3.2) Operation Overview

In the following, Operation Examples 1 to 4 for the Msg3 (may be a PUSCH) Repetition will be described.

(Operation Example 1): The UE 200 uses PRACH resources corresponding to whether there is a request/support for Msg3 Repetition, based on the RRC configuration.

(Operation Example 2): The UE 200 reports whether Joint channel estimation can be applied to the Msg3.

(Operation Example 3): The UE 200 determines the condition for requesting Msg3 Repetition, based on a predetermined rule or parameters configured by the RRC.

(Operation Example 4): At the time of Msg3 Repetition, the UE 200 transmits a message with applying the RV id in each transmission occasion, based on a predetermined rule or parameters configured by the RRC.

(3.3) Operation Example 1

In the present operation example, a description will be given regarding an operation in which the UE 200 uses PRACH resources corresponding to whether there is a request/support for Msg3 Repetition, based on the RRC configuration.

Specifically, the UE 200 may use different PRACH resources/sequences depending on whether there is a request/support for Msg3 Repetition.

Figure 6:
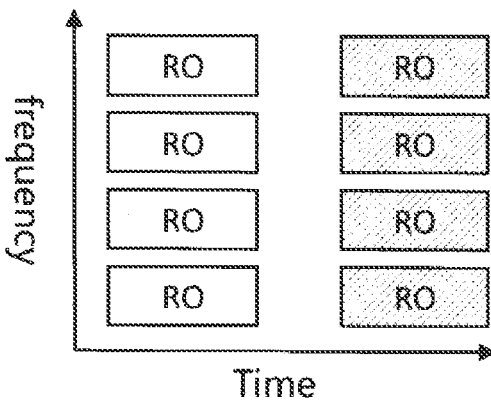
FIG. 6 is a diagram showing an example of the correspondence between a RACH Occasion and whether there is a request/support for Msg3 Repetition in Operation Example 1.
Figure 7:
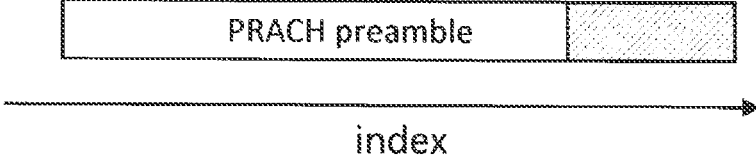
FIG. 7 is a diagram showing an example of the correspondence between a RACH preamble and whether there is a request/support for Msg3 Repetition in Operation Example 1.

FIG. 6 shows an example of the correspondence between a RACH Occasion and whether there is a request/support for Msg3 Repetition in Operation Example 1. FIG. 7 shows an example of the correspondence between a RACH preamble and whether there is a request/support for Msg3 Repetition in Operation Example 1.

For example, the UE 200 may transmit a PRACH at different PRACH preambles and/or RACH Occasions (ROs, time or frequency) depending on whether there is a request/support therefor.

In addition, the UE 200 may specify a PRACH preamble and/or RO according to whether there is a request/support therefor, based on a predetermined rule.

Alternatively, the UE 200 may specify a PRACH preamble and/or RO according to whether there is a request/support therefor, based on the RRC configuration. Note that if based on a predetermined rule, the same operation may be performed regardless of whether RRC parameters are configured.

If the UE 200 specifies a PRACH preamble and/or RO according to whether there is a request/support therefor, based on the RRC configuration, the following operations may be performed.

(Opt 1): A PRACH preamble when requesting/supporting Msg3 Repetition is configured.

(Opt 1-1): A preamble index when requesting/supporting Msg3 Repetition is configured.

Specifically, the number of PRACH preambles to request/support Msg3 Repetition may be specified. For example, the UE 200 may configure, in a RACH-ConfigCommon IE or the like, a parameter indicating the number of PRACH preambles when requesting/supporting Msg3 Repetition (for example, CBForMsg3Repetition-PreamblesPerSSB-Per-SharedRO (provisional name)). In this case, as shown in FIG. 8 (part 1) or FIG. 9 (part 2), the order in which preamble indexes are allocated may be determined based on a predetermined rule or the RRC configuration.

Figure 8:
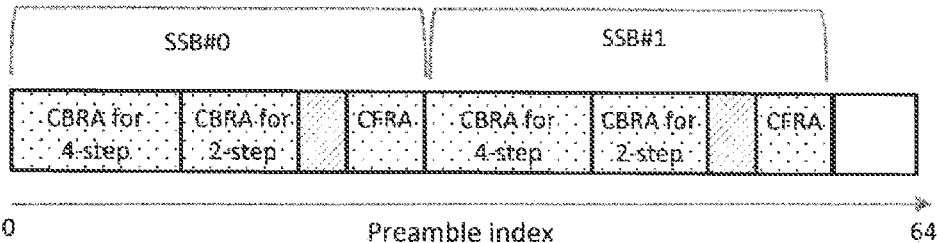
FIG. 8 is a diagram showing a configuration example (part 1) of a PRACH preamble in Operation Example 1.
Figure 9:
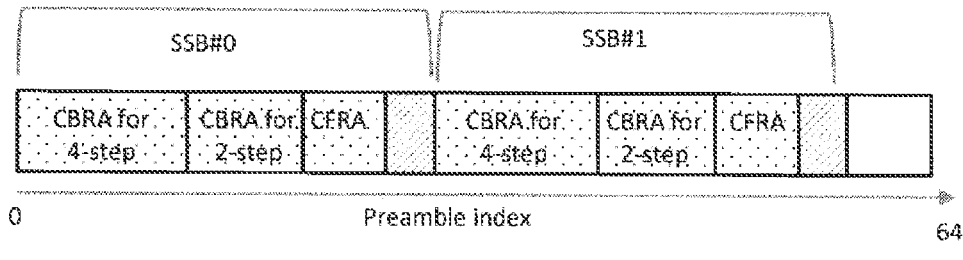
FIG. 9 is a diagram showing a configuration example (part 2) of a PRACH preamble in Operation Example 1.

FIG. 8 shows a configuration example (part 1) of the PRACH preamble in Operation Example 1, and FIG. 9 shows a configuration example (part 2) of the PRACH preamble in Operation Example 1.

Further, in this case, the number of PRACH preambles to request/support Msg3 Repetition may be specified. For example, an RRC parameter specifying each SSB index and preamble index may be configured.

As shown in FIG. 8, a start index of the PRACH preamble to request/support Msg3 Repetition may be determined from the number of preamble indexes in each case.

Further, in the case of (Opt 1), a preamble index that is applied when requesting/supporting Msg3 Repetition may be a preamble of part of contention based random access (CBRA) for 3GPP Releases 15 and 16. Alternatively, a preamble index when requesting/supporting Msg3 Repetition may be a preamble that is allocated separately from that of the CBRA for 3GPP Releases 15 and 16.

FIG. 10 shows a configuration example (part 3) of the PRACH preamble in Operation Example 1, and FIG. 11 shows a configuration example (part 4) of the PRACH preamble in Operation Example 1.

In the example of FIG. 10, a part of the CBRA RACH preamble specified by totalNumberOfRA-Preambles may be allocated for requesting/supporting Msg3 Repetition.

In the example of FIG. 11, a RACH preamble may be allocated for requesting/supporting Msg3 Repetition separately from the CBRA RACH preamble specified by total-NumberOfRA-Preambles.

(Opt 1-2): A Random access preamble Group requesting/supporting Msg3 Repetition is configured.

Figure 12:
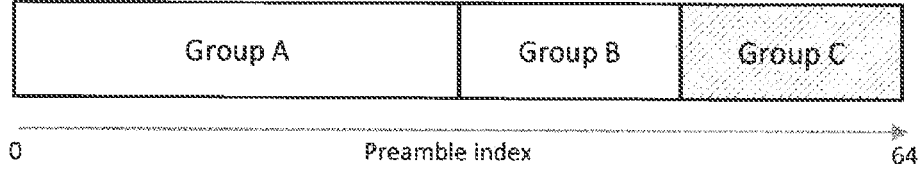
FIG. 12 is a diagram showing a configuration example of a Random access preamble Group in Operation Example 1.

FIG. 12 shows a configuration example of the Random access preamble Group in Operation Example 1. As shown in FIG. 12, a new Random access preamble Group (Group C) may be added in addition to Groups A and B.

In addition, a parameter specifying the number of preambles in the Group C (numberOfRA-PreamblesGroupC (provisional name)) may be configured and which of the preamble indexes corresponds to the group may be judged.

If a new Random access preamble Group (Group C) is added, for example, Group A or Group B may not be used. An index of Group C or B may be specified by configuring the number of preamble indexes of Group B or C.

Further, the preamble of Group A or B may be for the Random access preamble Group requesting/supporting Msg3 Repetition. For example, with the parameter of the RRC, Group A or B may be configured as the Random access preamble Group requesting/supporting Msg3 Repetition.

(Opt 2): A PRACH transmission occasion when requesting/supporting Msg3 Repetition is added.

(Opt 2-1): The PRACH resource when requesting/supporting Msg3 Repetition is added in the frequency direction.

FIG. 13 shows a configuration example (part 1) of the PRACH resource in the frequency direction in Operation Example 1. As shown in FIG. 13, for example, the UE 200 may configure, in a RACH-ConfigGeneric IE or the like, a parameter indicating the number of PRACH transmission occasions subjected to time division multiplexing (FDM) when requesting/supporting Msg3 Repetition (for example, Msg1-FDMForMsg3Repetition ENUMERATED {one, two, four, eight}). In this case, the number of SSBs per added PRACH transmission occasion may be configured.

In this case, Msg1-FDM may mean the number of FDMs of all PRACH transmission occasions not requesting/supporting Msg3 Repetition.

In addition, as shown in FIG. 13, in the frequency direction, it may be judged that there are resources with Msg3 Repetition request/support in the directions above, below, and both above and below with respect to resources without Msg3 Repetition request/support.

(Opt 2-2): In the frequency direction, the PRACH resources are divided depending on whether there is a request/support for Msg3 Repetition.

FIG. 14 shows a configuration example (part 2) of the PRACH resources in the frequency direction in Operation Example 1. As shown in FIG. 14, for example, the UE 200 may configure, in a RACH-ConfigGeneric IE or the like, a parameter indicating the number of PRACH transmission occasions subjected to FDM when requesting/supporting Msg3 Repetition and a parameter indicating the total number of PRACH transmission occasions subjected to FDM.

In this case, Msg1-FDM may mean the FDM number of all PRACH transmission occasions.

Further, as shown in FIG. 14, it may be judged that there are resources with Msg3 Repetition request/support in the directions above, below, and both above and below with respect to resources without Msg3 Repetition request/support.

(Opt 2-3): PRACH resources for when requesting/supporting Msg3 Repetition are added in the time direction.

(Alt 1): Another PRACH Configuration is configured for a PRACH when requesting/supporting Msg3 Repetition.

FIG. 15 shows a configuration example (part 1) of a PRACH Configuration for Msg3 Repetition in Operation Example 1. As shown in FIG. 15, a specific PRACH Configuration may be configured for a PRACH when requesting/supporting Msg3 Repetition.

For example, the UE 200 may configure, in a RACH-ConfigGeneric IE, a parameter specifying a PRACH Configuration when requesting/supporting Msg3 Repetition (for example, prachForMsg3Reptition-ConfigurationIndex INTEGER (0 . . . 255), (provisional name)). In this case, some parameters (such as formats) may be shared with another PRACH Configuration.

(Alt 2): A PRACH Configuration of 4 step CBRA, 2 step CBRA, or contention-free random access (CFRA) is configured for PRACH time resources for when requesting/supporting Msg3 Repetition.

FIG. 16 shows a configuration example (part 2) of a PRACH Configuration for Msg3 Repetition in Operation Example 1.

For example, the UE 200 may add, in a RACH-ConfigGeneric IE, PRACH time resources for when requesting/supporting Msg3 Repetition or may implicitly judge the resource. Specifically, as shown in FIG. 16, PRACH time resources for when requesting/supporting Msg3 Repetition (starting symbol and/or subframe number for Msg3 Repetition) may be added.

(3.4) Operation Example 2

In the present operation example, a description will be given regarding an operation in which the UE 200 reports whether Joint channel estimation can be applied to the Msg3.

In Msg3 Repetition transmission, the UE 200 may transmit DMRSs such that Joint channel estimation between slots can be performed (for example, transmission is performed such that the power/phase in the DMRSs is constant).

The UE 200 may report whether Joint channel estimation can be applied to the Msg3 with the Msg1. In this case, the UE 200 may specify a PRACH preamble and/or RACH occasion according to whether there is a request/support therefor, based on a predetermined rule. With the predetermined rule, the UE 200 may specify the PRACH preamble and/or RACH occasion in the same manner as in Operation Example 1 regardless of whether RRC parameters are configured.

Further, the UE 200 may report whether Joint channel estimation can be applied only if information that the gNB 100 supports Joint channel estimation is reported to the UE 200 from the network (gNB 100) via SIB1.

The network (gNB 100) may judge that Joint channel estimation can be applied if Msg3 Repetition is supported. The UE 200 may specify the PRACH preamble and/or RACH occasion according to whether there is a request/support therefor, based on the RRC configuration (the UE 200 may configure the PRACH according to whether there is a request/support for Joint channel estimation in the same manner as in Operation Example 1).

Alternatively, whether Joint channel estimation can be applied to the Msg3 may be reported with the Msg3. In this case, the UE 200 may transmit a DMRS using a different DMRS port depending on whether there is a request/support therefor. Further, the UE 200 may judge whether the DMRS port supports the request/support of Joint channel estimation, based on a System Information Block (SIB) 1 or a predetermined rule.

The UE 200 may multiplex, to the Msg3, uplink control information (UCI) to judge whether there is a request/support therefor, and transmit the information. In this case, the UE 200 may determine whether to report Joint channel estimation request/support via UCI, based on a SIB1 or predetermined rule.

(3.5) Operation Example 3

In the present operation example, a description will be given regarding an operation in which the UE 200 determines a condition for requesting Msg3 Repetition, based on a predetermined rule or a parameter configured by the RRC.

For example, the UE 200 may determine whether to request Msg3 Repetition, based on the following conditions (which may be combined).

13

Figure 17:
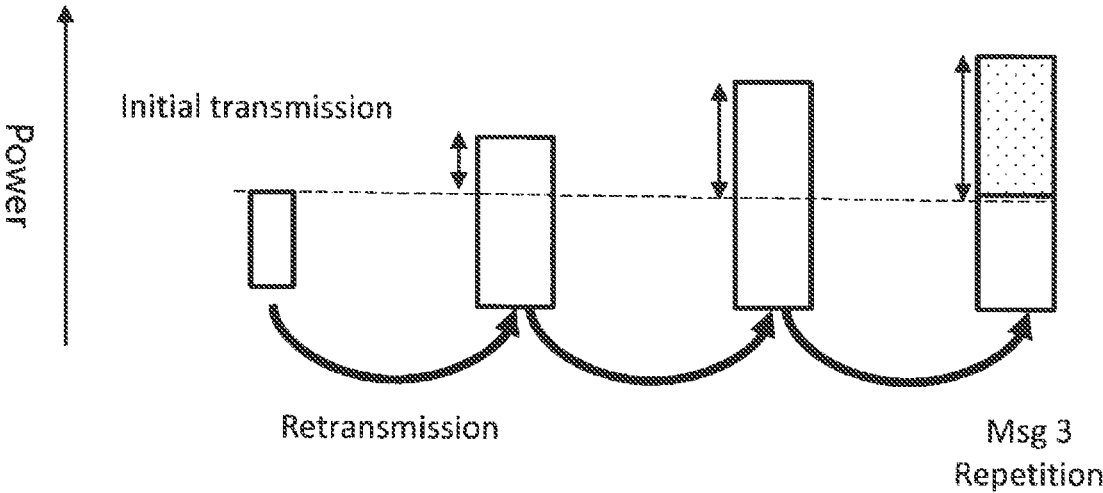
FIG. 17 is a diagram showing an example of power ramping in Operation Example 3.

(Opt 1): RSRP of an SSB (or distance attenuation calcu-
   lated based on an SSB) exceeds a threshold value.
   In this case, the threshold value of an RSRP (or distance
attenuation) may be determined based on a predetermined
rule or RRC configuration.
   (Opt 2): The number of transmission attempts for the
      Msg1 exceeds a threshold value.
   In this case, the threshold value of the number of trans-
mission attempts may be determined based on a predeter-
mined rule or RRC configuration.
   (Opt 3): Total power value obtained with power ramping
      up exceeds a threshold value.
   In this case, the threshold value of the total power value
obtained with power ramping up may be determined based
on a predetermined rule or RRC configuration.
   FIG. 17 shows an example of power ramping in Operation
Example 3. As shown in FIG. 17, a Msg regarding a PRACH
or PUSCH is re-transmitted and power ramping is per-
formed per re-transmission, but if the power ramp up
amount exceeds the threshold value, Msg3 Repetition may
be applied.

(3.6) Operation Example 4

In the present operation example, a description will be
given regarding an operation in which the UE 200 transmits
a message with applying an RV id in each transmission
occasion, based on a predetermined rule or a parameter
configured by the RRC at the time of the Msg3 Repetition.
   The UE 200 may transmit a message with applying an RV
id in each transmission occasion, based on a predetermined
rule or a parameter configured by the RRC at the time of the
Msg3 Repetition.
   In this case, the UE 200 may apply (configure) the same
or different RV from a PUSCH scheduled by a RAR UL
grant or a PUSCH scheduled by DCI scrambled by TC-
RNTI.
   FIG. 18 shows an application example (part 1) of an RV
id in a transmission occasion in Operation Example 4. FIG.
18 shows examples of Opt 1 to Opt 4.
   The UE 200 may apply any RV id to perform transmission
in each transmission occasion (for example, the initial
transmission (a PUSCH scheduled by a RAR UL grant)).
   The RV ids of which table (Opt 1 to Opt 4) are to be
applied may be configured via RRC or a predetermined rule.
In this case, different tables may be applied depending on the
time division multiplexing (TDD) pattern.
   FIG. 19 shows an application example (part 2) of an RV
id in a transmission occasion in Operation Example 4. FIG.
19 shows examples of Opt 1 to Opt 3.
   The UE 200 may apply any RV id to perform transmission
in each transmission occasion (for example, re-transmission
(a PUSCH scheduled by DCI scrambled by TC-RNTI)).

(4) Action and Effect

According to the above embodiment, the following action
and effects can be obtained. Specifically, the UE 200 can
configure a random access resource according to whether
there is Msg3 Repetition, based on the RRC configuration.
   Further, the UE 200 can report, to the network, whether
channel estimation (Joint channel estimation) of uplink
channels allocated to a plurality of slots can be applied to the
Msg3 using the DMRSs allocated to the plurality of slots.
   Further, the UE 200 can request Msg3 Repetition based on
whether a specific condition regarding random access is satisfied, and can configure the RV id applied to the trans-
mission of the Msg3, based on the RRC configuration or a
specific criterion.
   Therefore, the operation of the UE 200 at the time of the
Msg3 Repetition can be made more efficient and rational.
That is, the UE 200 can perform a more appropriate opera-
tion for Repetition of a message (Msg3) of the RACH
procedure.

(5) Other Embodiments

Figure 20:
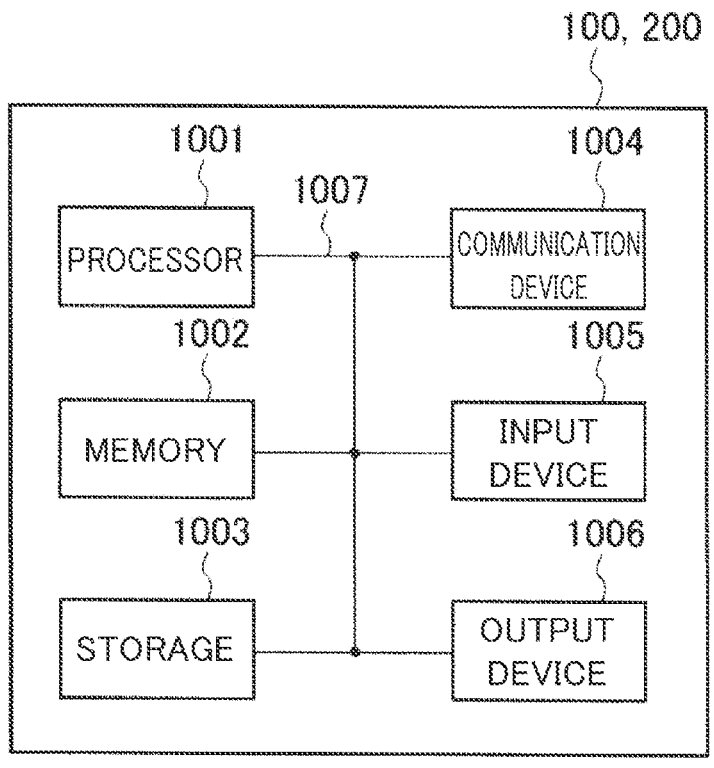
FIG. 20 is a diagram showing an example of a hardware configuration of a gNB 100 and UE 200.

Although the embodiment has been described above, it is
obvious to those skilled in the art that the present disclosure
is not limited to the description of the embodiment and that
various modifications and improvements thereof are pos-
sible.
   For example, in the above-described embodiment, the
Repetition of an Msg3 and a PUSCH has been described, but
the above-described operation regarding the Repetition may
be applied to a message in a RACH procedure or another
uplink channel.
   Further, a PUSCH may be referred to as a Physical Uplink
Shared Channel, and a channel may not necessarily be a
PUSCH as long as it is a channel (physical channel) shared
by a plurality of UEs 200 (users) in an UL.
   Further, in the above description, terms such as configure,
activate, update, indicate, enable, specify, and select may be
read interchangeably. Similarly, terms such as link, associ-
ate, correspond, and map may be read interchangeably, and
terms such as allocate, assign, monitor, and map may be read
interchangeably.
   In addition, terms such as specific, dedicated, UE-specific,
and UE-dedicated may be read interchangeably. Similarly,
terms such as common, shared, group-common, UE-com-
mon, and UE-shared may be read interchangeably.
   The block diagram (FIG. 3) used in the description of the
above-described embodiment shows blocks in units of func-
tions. Those functional blocks (components) can be realized
by a desired combination of at least one of hardware and
software. A realization method for each functional block is
not particularly limited. That is, each functional block may
be realized by using one device combined physically or
logically. Alternatively, two or more devices separated
physically or logically may be directly or indirectly con-
nected (for example, wired, or wireless) to each other, and
each functional block may be realized by these plural
devices. The functional blocks may be realized by combin-
ing software with the one device or the plural devices
mentioned above.
   Functions include judging, deciding, determining, calcu-
lating, computing, processing, deriving, investigating,
searching, confirming, receiving, transmitting, outputting,
accessing, resolving, selecting, choosing, establishing, com-
paring, assuming, expecting, considering, broadcasting,
notifying, communicating, forwarding, configuring, recon-
figuring, allocating (mapping), assigning, and the like. How-
ever, the functions are not limited thereto. For example, a
functional block (component) that makes a transmitting
function work is called a transmitting unit or a transmitter.
For any of the above, as described above, the realization
method is not particularly limited.
   Further, the above-described gNB 100, and UE 200 (the
device) may function as a computer that performs process-
ing of a radio communication method of the present disclo-
sure. FIG. 20 is a diagram showing an example of a
hardware configuration of the device. As shown in FIG. 20,
the device may be configured as a computer device including a processor 1001, a memory 1002, a storage 1003, a communication device 1004, an input device 1005, an output device 1006, a bus 1007, and the like.

Furthermore, in the following description, the term "device" can be substituted with circuit, device, unit, or the like. The hardware configuration of the device may include one or more devices shown in the figure or may not include some of the devices.

Each of the functional blocks of the device (see FIG. 3) is implemented by means of any of hardware elements of the computer device or a combination of the hardware elements.

In addition, each function in the device is realized by loading predetermined software (programs) on hardware such as the processor 1001 and the memory 1002 so that the processor 1001 performs arithmetic operations to control communication via the communication device 1004 and to control at least one of reading and writing of data on the memory 1002 and the storage 1003.

The processor 1001 operates, for example, an operating system to control the entire computer. The processor 1001 may be configured with a Central Processing Unit (CPU) including interfaces with peripheral devices, control devices, arithmetic devices, registers, and the like.

Moreover, the processor 1001 reads a program (program code), a software module, data, and the like from at least one of the storage 1003 and the communication device 1004 into the memory 1002, and executes various processes according to these. As the program, a program causing the computer to execute at least part of the operation described in the above embodiment is used. Alternatively, various processes described above can be executed by one processor 1001 or can be executed simultaneously or sequentially by two or more processors 1001. The processor 1001 can be implemented by using one or more chips. Alternatively, the program may be transmitted from a network via a telecommunication line.

The memory 1002 is a computer readable recording medium and may be configured, for example, with at least one of a Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), and the like. The memory 1002 may store therein programs (program codes), software modules, and the like that can execute the method according to one embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 can be referred to as an auxiliary storage device. The recording medium can be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Also, the respective devices such as the processor 1001 and the memory 1002 are connected to each other with the bus 1007 for communicating information. The bus 1007 may be constituted by a single bus or may be constituted by different buses for each device-to-device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, notification of information is not limited to that in the aspect/embodiment described in the present disclosure, and may be performed by using other methods. For example, notification of information may be performed by physical layer signaling (for example, Downlink Control Information (DCI), Uplink Control Information (UCI)), higher layer signaling (for example, RRC signaling, Medium Access Control (MAC) signaling), broadcast information (Master Information Block (MIB), System Information Block (SIB)), other signals, or a combination thereof. The RRC signaling may also be referred to as an RRC message, for example, or may be an RRC Connection Setup message, an RRC Connection Reconfiguration message, or the like.

Each aspect/embodiment described in the present disclosure can be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of LTE and LTE-A with 5G) and applied.

The order of the processing procedures, sequences, flowcharts, and the like of each aspect/embodiment described in the present disclosure may be exchanged as long as there is no contradiction. For example, the methods described in the present disclosure present the elements of the various steps by using an exemplary order and are not limited to the presented specific order.

The specific operation that is performed by a base station in the present disclosure may be performed by its upper node in some cases. In a network constituted by one or more network nodes having a base station, it is obvious that the various operations performed for communication with the terminal may be performed by at least one of the base station and other network nodes other than the base station (for example, an MME, an S-GW, and the like may be considered, but there is not limited thereto). In the above, an example in which there is one network node other than the base station is explained; however, a combination of a plurality of other network nodes (for example, an MME and an S-GW) may be used.

Information and signals (information and the like) can be output from a higher layer (or lower layer) to a lower layer (or higher layer). These may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by using a value (0 or 1) represented by one bit, by truth-value (Boolean: true or false), or by comparison of numerical values (for example, comparison with a predetermined value).

Each of the aspects/embodiment described in the present disclosure may be used separately or in combination, or may be switched in accordance with the execution. In addition, notification of predetermined information (for example, notification of "is X") is not limited to being performed explicitly, and it may be performed implicitly (for example, without notifying the predetermined information).

Regardless of being referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instruction, information, and the like may be transmitted and received via a transmission medium. For example, when software is transmitted from a website, a server, or another remote source by using at least one of a wired technology (a coaxial cable, an optical fiber cable, a twisted pair cable, a Digital Subscriber Line (DSL), or the like) and a wireless technology (infrared light, microwave, or the like), then at least one of these wired and wireless technologies is included within the definition of the transmission medium.

Information, signals, or the like described in the present invention may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or a desired combination thereof.

It should be noted that the terms described in the present disclosure and terms necessary for understanding the present disclosure may be replaced with terms having the same or similar meanings. For example, at least one of a channel and a symbol may be a signal (signaling). A signal may also be a message. Further, a Component Carrier (CC) may be referred to as a carrier frequency, a cell, a frequency carrier, or the like.

The terms "system" and "network" used in the present disclosure can be used interchangeably.

Furthermore, information, parameters, and the like described in the present disclosure can be represented by an absolute value, can be represented by a relative value from a predetermined value, or can be represented by corresponding other information. For example, a radio resource can be indicated using an index.

Names used for the above parameters are not restrictive names in any respect. In addition, formulas and the like using these parameters may be different from those explicitly disclosed in the present disclosure. Since the various channels (for example, a PUCCH, a PDCCH, or the like) and information elements can be identified by any suitable names, the various names allocated to these various channels and information elements shall not be restricted in any way.

In the present disclosure, the terms such as "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. A base station may also be referred to with a term such as a macro cell, a small cell, a femtocell, or a pico cell.

A base station can accommodate one or more (for example, three) cells (also referred to as sectors). In a configuration in which a base station accommodates a plurality of cells, the entire coverage area of the base station can be divided into a plurality of smaller areas. In each of the smaller areas, a communication service can be provided by a base station subsystem (for example, a small base station for indoor use (remote radio head: RRH)).

The term "cell" or "sector" refers to a part or all of the coverage area of at least one of a base station and a base station subsystem that performs a communication service in this coverage.

In the present disclosure, the terms such as "mobile station (Mobile Station: MS)", "user terminal", "user equipment (User Equipment: UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

At least one of a base station and a mobile station may be called a transmitting device, a receiving device, a communication device, or the like. Note that at least one of a base station and a mobile station may be a device mounted on a moving body, a moving body itself, or the like. The moving body may be a vehicle (for example, a car, an airplane, or the like), an unmanned moving body (a drone, a self-driving car, or the like), or a robot (manned type or unmanned type). At least one of a base station and a mobile station also includes a device that does not necessarily move during the communication operation. For example, at least one of a base station and a mobile station may be an Internet of Things (IoT) device such as a sensor.

Also, a base station in the present disclosure may be substituted with a mobile station (user terminal, hereinafter the same). For example, each aspect/embodiment of the present disclosure may be applied to a configuration in which communication between a base station and a mobile station is replaced with communication between a plurality of mobile stations (for example, this may be called Device-to-Device (D2D), Vehicle-to-Everything (V2X), or the like).

In this case, the mobile station may have the function of a base station. In addition, words such as "uplink" and "downlink" may also be substituted with words corresponding to inter-terminal communication (for example, "side"). For example, an uplink channel, a downlink channel, or the like may be substituted with a side channel.

Similarly, the mobile station in the present disclosure may be read as a base station. In this case, the base station may have the function of the mobile station. A radio frame may be composed of one or more frames in the time domain. Each of the one or more frames in the time domain may be referred to as a subframe. A subframe may be further composed of one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, subcarrier spacing (SCS), bandwidth, symbol length, cyclic prefix length, transmission time interval (TTI), the number of symbols per TTI, radio frame configuration, a specific filtering process performed by a transceiver in the frequency domain, a specific windowing process performed by a transceiver in the time domain, and the like.

A slot may be composed of one or more symbols (Orthogonal Frequency Division Multiplexing (OFDM)) symbols, Single Carrier Frequency Division Multiple Access (SC-FDMA) symbols, and the like) in the time domain. A slot may be a unit of time based on the numerology.

A slot may include a plurality of minislots. Each minislot may be composed of one or more symbols in the time domain. A minislot may be called a subslot. A minislot may be composed of fewer symbols than slots. A PDSCH (or PUSCH) transmitted in time units greater than the minislot may be referred to as a PDSCH (or PUSCH) mapping type A. A PDSCH (or PUSCH) transmitted using a minislot may be referred to as a PDSCH (or PUSCH) mapping type B.

Each of a radio frame, subframe, slot, minislot, and symbol represents a time unit for transmitting a signal. A radio frame, subframe, slot, minislot, and symbol may have respectively different names corresponding to them.

For example, one subframe may be called a transmission time interval (TTI), a plurality of consecutive subframes may be called a TTI, and one slot or one minislot may be called a TTI. That is, at least one of the subframe and TTI may be a subframe (1 ms) in the existing LTE, a period shorter than 1 ms (for example, 1-13 symbols), or a period longer than 1 ms. Note that, a unit representing TTI may be called a slot, a minislot, or the like instead of a subframe.

Here, a TTI refers to the minimum time unit of scheduling in radio communication, for example. For example, in the LTE system, the base station performs scheduling for allocating radio resources (frequency bandwidth, transmission power, and the like that can be used in each user terminal) to each user terminal in units of TTI. The definition of TTI is not limited to this.

A TTI may be a transmission time unit such as a channel-encoded data packet (transport block), a code block, or a code word, or may be a processing unit such as scheduling or link adaptation. When a TTI is given, a time interval (for example, the number of symbols) in which a transport block, a code block, a code word, and the like are actually mapped may be shorter than TTI.

When one slot or one minislot is called a TTI, one or more TTIs (that is, one or more slots or one or more minislots) may be the minimum time unit of the scheduling. The number of slots (minislot number) constituting the minimum time unit of the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, and the like. A TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, and the like) may be read as a TTI having a time length exceeding 1 ms, and a short TTI (for example, shortened TTI) may be read as a TTI having a TTI length of less than a TTI length of a long TTI and a TTI length of 1 ms or more.

A resource block (RB) is a resource allocation unit in the time domain and the frequency domain, and may include one or more consecutive subcarriers in the frequency domain. The number of subcarriers included in the RB may be the same regardless of the numerology, and may be 12, for example. The number of subcarriers included in the RB may be determined based on the numerology.

Further, the time domain of an RB may include one or more symbols, and may have a length of 1 slot, 1 minislot, 1 subframe, or 1 TTI. Each TTI, subframe, or the like may be composed of one or more resource blocks.

Note that, one or more RBs may be called a physical resource block (PRB), a sub-carrier group (SCG), a resource element group (REG), a PRB pair, a RB pair, and the like.

A resource block may be configured by one or more resource elements (REs). For example, one RE may be a radio resource domain of one subcarrier and one symbol.

A bandwidth part (BWP) (which may be called a partial bandwidth or the like) may represent a subset of consecutive common resource blocks (RBs) for a certain numerology in a certain carrier. Here, the common RB may be specified by an index of the RB based on the common reference point of the carrier. A PRB may be defined in a certain BWP and numbered within that BWP.

A BWP may include a BWP for UL (UL BWP) and a BWP for DL (DL BWP). One or more BWPs may be set in one carrier for the UE.

At least one of the configured BWPs may be active, and the UE does not have to expect to transmit and receive predetermined signals/channels outside the active BWP. Note that "cell", "carrier", and the like in this disclosure may be read as "BWP".

The above-described structures such as a radio frame, a subframe, a slot, a minislot, and a symbol are merely examples. For example, structures such as the number of subframes included in a radio frame, the number of slots per subframe or radio frame, the number of minislots included in a slot, the number of symbols and RBs included in a slot or minislot, the number of subcarriers included in RBs, and the number of symbols included in a TTI, a symbol length, the cyclic prefix (CP) length, and the like can be changed in various manner.

The terms "connected", "coupled", or any variations thereof mean any direct or indirect connection or coupling between two or more elements, and can include that one or more intermediate elements are present between two elements that are "connected" or "coupled" to each other. The coupling or connection between the elements may be physical, logical, or a combination thereof. For example, "connection" may be substituted with "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in the radio frequency domain, a microwave region, and a light (both visible and invisible) region, and the like.

A reference signal may be abbreviated as RS and may be called a pilot according to applicable standards.

As used in the present disclosure, the phrase "based on" does not mean "based only on" unless explicitly stated otherwise. In other words, the phrase "based on" means both "based only on" and "based at least on".

"Means" in the configuration of each device above may be replaced with "unit", "circuit", "device", and the like.

Any reference to elements using a designation such as "first", "second", or the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive-OR.

Throughout the present disclosure, for example, during translation, if articles such as a, an, and the in English are added, the present disclosure may include that a noun following these articles is used in plural.

As used in this disclosure, the term "determining" may encompass a wide variety of actions. "determining" includes deeming that determining has been performed by, for example, judging, calculating, computing, processing, deriving, investigating, searching (looking up, search, inquiry) (for example, searching in a table, database, or another data structure), ascertaining, and the like. In addition, "determining" can include deeming that determining has been performed by receiving (for example, receiving information), transmitting (for example, transmitting information), inputting (input), outputting (output), access (accessing) (for example, accessing data in a memory), and the like. In addition, "determining" can include deeming that determining has been performed by resolving, selecting, choosing, establishing, comparing, and the like. That is, "determining" may include deeming that "determining" regarding some action has been performed. Moreover, "determining" may be read as "assuming", "expecting", "considering", and the like.

In the present disclosure, the wording "A and B are different" may mean "A and B are different from each other". It should be noted that the wording may mean "A and B are each different from C". Terms such as "separate", "couple", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST 10 radio communication system
20 NG-RAN 100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage
1004 communication device
1005 input device
1006 output device
1007 bus

The invention claimed is:

1. A terminal comprising:
a receiver that receives, via a radio resource control layer, configuration information including a first index corresponding to a first preamble for another terminal that does not support repeated transmission of a physical uplink shared channel (PUSCH) in a random access procedure, a second index corresponding to a second preamble, which is different from the first preamble, for the terminal that supports the repeated transmission of the PUSCH in the random access procedure and the number of the second preambles;
a processor that determines transmission of the second preamble based on the second index and the number of the second preambles; and
a transmitter that performs the repeated transmission of the PUSCH after transmitting the second preamble,
wherein the processor determines a threshold of an RSRP based on a configuration of the radio resource control layer, and determines whether to perform the repeated transmission of the PUSCH based on whether a received quality of a downlink signal exceeds the threshold of the RSRP, and
wherein the repeated transmission of the PUSCH is scheduled by downlink control information format 0_0 associated with a temporary identifier for the random access procedure.

2. The terminal according to claim 1, wherein the second index is a start index of the second preamble.

3. A radio communication system comprising a base station and a terminal, wherein
the base station comprises a transmitter that transmits, via a radio resource control layer, configuration information including a first index corresponding to a first preamble for another terminal that does not support repeated transmission of a physical uplink shared channel (PUSCH) in a random access procedure, a second index corresponding to a second preamble, which is different from the first preamble, for the terminal that supports the repeated transmission of the PUSCH in the random access procedure and the number of the second preambles, and
the terminal comprises:
a receiver that receives the configuration information;
a processor that determines transmission of the second preamble based on the second index and the number of the second preambles; and
a transmitter that performs the repeated transmission of the PUSCH after transmitting the second preamble,
wherein the processor determines a threshold of an RSRP based on a configuration of the radio resource control layer, and determines whether to perform the repeated transmission of the PUSCH based on whether a received quality of a downlink signal exceeds the threshold of the RSRP, and wherein the repeated transmission of the PUSCH is scheduled by downlink control information format 0_0 associated with a temporary identifier for the random access procedure.

4. A radio communication method performed by a terminal, comprising:

receiving, via a radio resource control layer, configuration information including a first index corresponding to a first preamble for another terminal that does not support repeated transmission of a physical uplink shared channel (PUSCH) in a random access procedure, a second index corresponding to a second preamble, which is different from the first preamble, for the terminal that supports the repeated transmission of the PUSCH in the random access procedure and the number of the second preambles;

determining transmission of the second preamble based on the second index and the number of the second preambles;

determining a threshold of an RSRP based on a configuration of the radio resource control layer;

determining whether to perform the repeated transmission of the PUSCH based on whether a received quality of a downlink signal exceeds the threshold of the RSRP; and performing the repeated transmission of the PUSCH after transmitting the second preamble, wherein the repeated transmission of the PUSCH is scheduled by downlink control information format 0_0 associated with a temporary identifier for the random access procedure.

* * * * *